United States Patent [19]
Ter Horst

[11] Patent Number: 5,674,303
[45] Date of Patent: Oct. 7, 1997

[54] FILTER ASSEMBLY

[76] Inventor: Dirk Dieter Hans Ter Horst, Aparraro 80 150, Caracas 1080 A, Venezuela

[21] Appl. No.: 585,525

[22] Filed: Jan. 16, 1996

[51] Int. Cl.[6] .......................... B01D 39/20; B01D 29/07
[52] U.S. Cl. .................. 55/497; 55/501; 55/502; 55/511; 55/513; 55/521; 55/DIG. 5
[58] Field of Search ................... 55/497, 499–502, 55/507, 509, 511, 513, 521, DIG. 5; 210/493.1, 493.3, 493.5

[56] References Cited

U.S. PATENT DOCUMENTS

| | | | |
|---|---|---|---|
| 2,137,246 | 11/1938 | Myers | 55/501 |
| 2,252,724 | 8/1941 | Myers | 55/502 |
| 2,415,579 | 2/1947 | Dahlman | 55/502 X |
| 2,463,435 | 3/1949 | Smellie | 55/509 X |
| 2,884,091 | 4/1959 | Baldwin . | |
| 3,447,689 | 6/1969 | Solymar | 210/493.1 X |
| 3,471,023 | 10/1969 | Rosaen | 210/493.1 X |
| 3,487,625 | 1/1970 | Lucas | 55/521 X |
| 3,494,113 | 2/1970 | Kinney | 55/481 |
| 3,659,719 | 5/1972 | Westlin et al. | 55/497 X |
| 3,695,012 | 10/1972 | Rolland | 55/521 X |
| 3,712,033 | 1/1973 | Gronholz | 55/502 X |
| 3,880,626 | 4/1975 | Griwatz et al. | 55/485 |
| 4,124,362 | 11/1978 | Westlin et al. | 55/509 |
| 4,177,050 | 12/1979 | Culbert et al. | 55/499 |
| 4,199,387 | 4/1980 | Hladik | 156/160 |
| 4,419,241 | 12/1983 | Hoffmann | 210/493.5 |
| 4,439,219 | 3/1984 | Lambrecht | 55/509 X |
| 4,584,005 | 4/1986 | Allan et al. | 55/499 |
| 4,608,066 | 8/1986 | Cadwell, Jr. | 55/502 X |
| 4,685,944 | 8/1987 | Allan et al. | 55/497 X |
| 4,865,637 | 9/1989 | Gruber | 55/502 |
| 4,885,015 | 12/1989 | Goulet et al. | 55/497 |
| 5,273,563 | 12/1993 | Pasch et al. | 55/497 X |
| 5,501,794 | 3/1996 | Van de Graaf et al. | 55/497 X |

FOREIGN PATENT DOCUMENTS

| | | | |
|---|---|---|---|
| 0082106 | 6/1983 | European Pat. Off. | 55/521 |
| WO91/19898 | 12/1991 | WIPO | 55/DIG. 5 |

*Primary Examiner*—Robert Spitzer
*Attorney, Agent, or Firm*—Bachman & LaPointe, P.C.

[57] ABSTRACT

A filter assembly is provided which includes a casing having an inner surface defining a fluid passage, a fluid inlet and a fluid outlet; a filter pack disposed in the fluid passage for filtering a fluid passed therethrough; and a flexible seal positioned between the filter pack and the inner surface of the casing for sealing the filter pack in the fluid passage to prevent flow of fluid between the filter pack and the inner surface and for allowing movement of the filter pack relative to the casing. One or two face screens may be positioned over the inlet and outlet, and the casing and screens are assembled without conventional fasteners or welding.

22 Claims, 3 Drawing Sheets

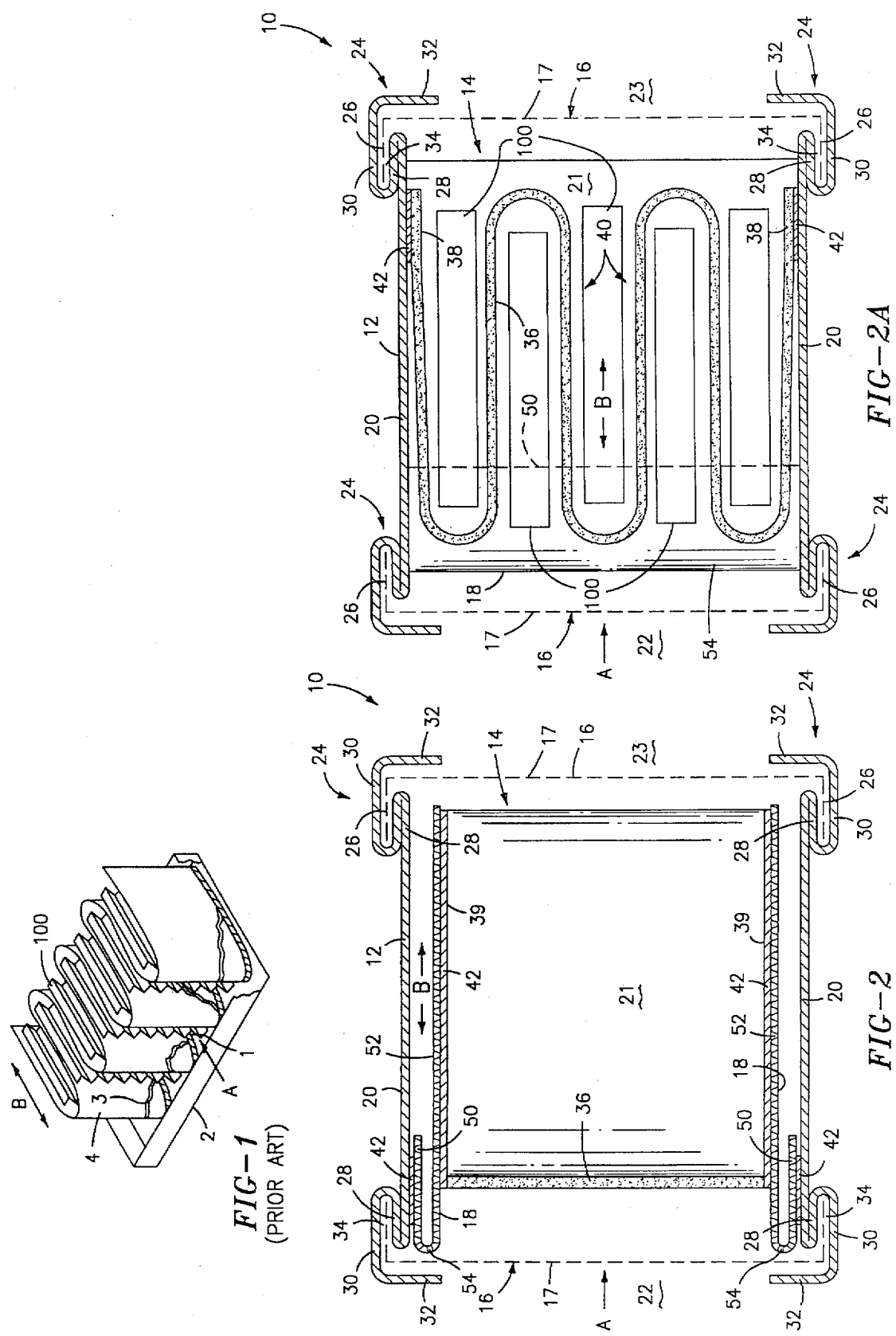

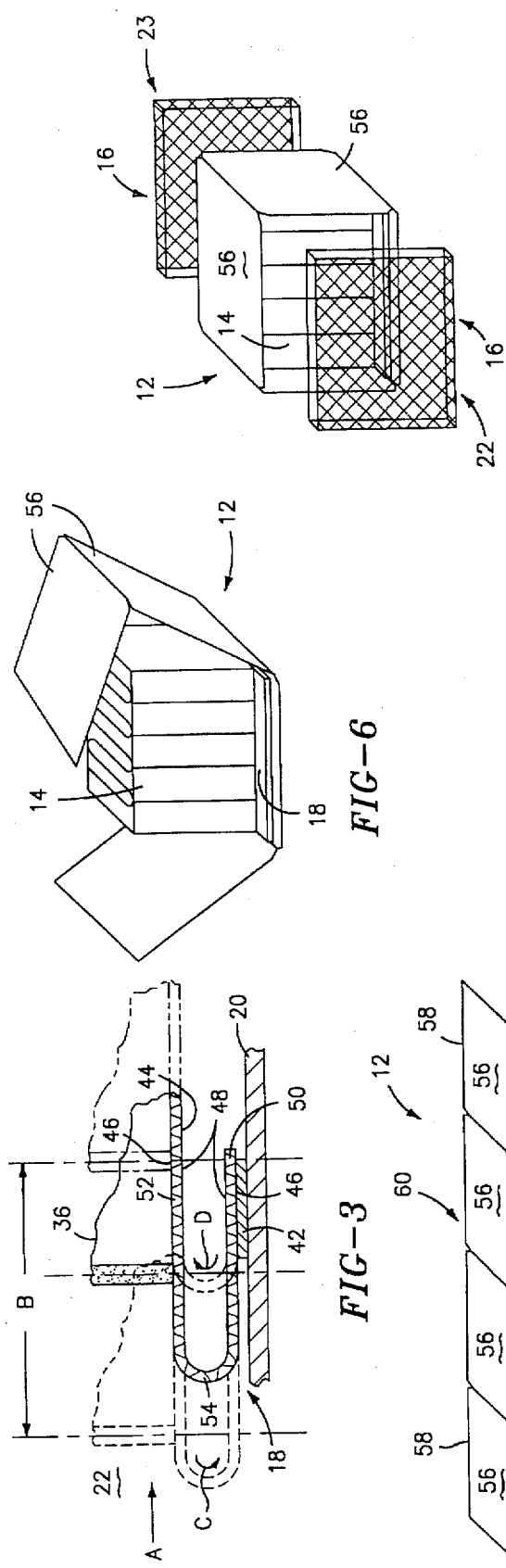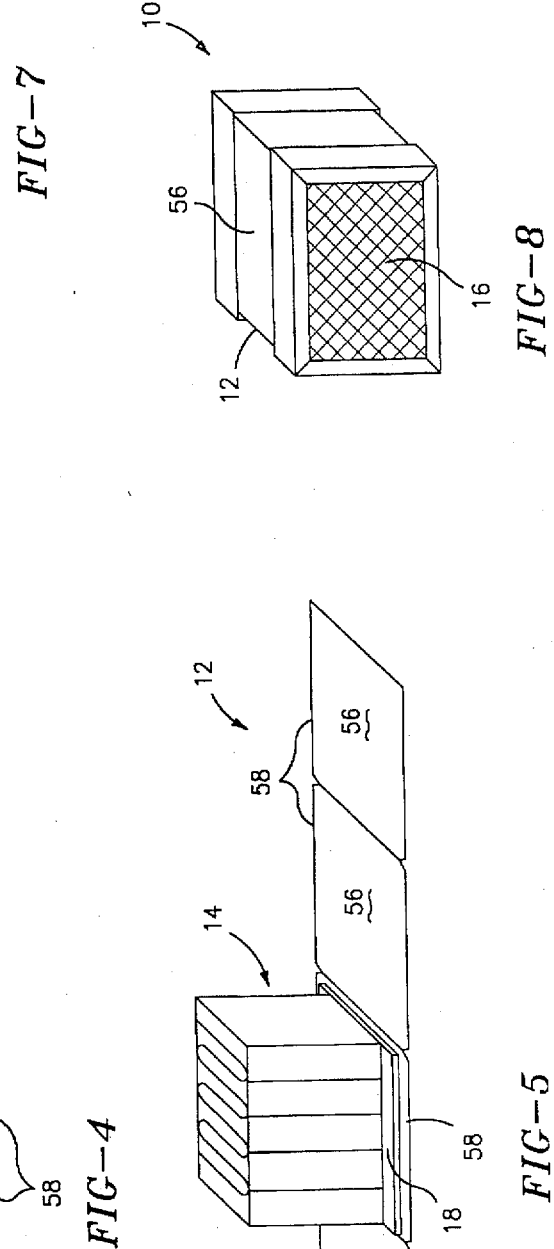

FILTER ASSEMBLY

BACKGROUND OF THE INVENTION

The invention relates to a filter assembly, especially to a filter assembly for air filters used in gas turbine intakes and the like.

Filters for air and other gases are commonly used in hostile environments and typically require a high degree of structural integrity and performance characteristics. Conventional filters for gas turbine and compressor intakes and the like generally use a filter media pack having a pleated structure so as to provide more media in the filter assembly. Pleated filters are referred to in the filter industry as extended surface filters.

A persistent problem with respect to filters as above is the prevention of bypass flow of non-filtered air or fluid around the filter media in the filter assembly. One area of persistent bypass problems is the area between the filter media and the inner surface of the filter casing.

Conventionally, the bypass problem is addressed by gluing the filter media to the inner side walls of the filter casing. FIG. 1 illustrates a conventional pleated filter media in a partially sectioned away filter casing. As shown, the pleated filter media is typically a sheet of filter material pleated in a repeating S pattern from side to side of the filter casing and kept separate by "separators" so the filter media does not touch between pleats. Air flow is directed into the pleats of the filter casing during use. Ends of the filter media are glued to side walls of the filter casing, and top and bottom edges of the filter media are glued to top and bottom walls of the filter casing.

During use, the operation of the turbine, compressor, blower or fan causes vibration and pulsations of the filter media within the casing. This causes a problem with respect to the seal of the top and bottom edges of the filter media which are sealed directly to the filter casing. Such direct sealing prevents the filter media from moving with the pulsations and thereby damping the forces exerted against the filter media. Over time, cracks form in the filter media which allow bypass and thereby significantly shorten the useful life of the filter assembly, and further create the risk of damage to turbine elements or other rotating equipment downstream of the filter.

U.S. Pat. Nos. 3,494,113, 4,199,387 and 4,885,015 are examples of prior art filters wherein edges of the filter media are directly sealed to or otherwise fixedly held with respect to the filter casing.

U.S. Pat. No. 2,884,091 discloses a filter which has a filter casing held together with various mechanical fasteners. Although some degree of structural integrity may be attained with such structures, fasteners and other separate components may come loose during operation, with the possibility of being ingested by downstream rotating turbine equipment such as turbine components or other rotating elements, thereby causing serious damage.

It is apparent that a need remains for a filter assembly wherein the filter media is reliably sealed relative to the filter casing so as to prevent bypass, and wherein the filter casing does not include separate fastener components and the like.

It is therefore the primary object of the present invention to provide a filter assembly wherein the filter media is effectively sealed to the filter casing.

It is another object of the present invention to provide a filter assembly wherein the filter media is movable with respect to the filter casing whereby forces exerted on the filter media during use are damped.

It is still another object of the invention to provide a filter assembly wherein the casing structure does not include conventional separate fastener components.

It is a further object of the invention to provide a method of manufacturing a filter assembly incorporating the above described objects and advantages.

Other objects and advantages will appear herein below.

SUMMARY OF THE INVENTION

According to the invention, the foregoing objects and advantages are readily attained.

A filter assembly is provided in accordance with the present invention which includes a casing having an inner surface defining a fluid passage, a fluid inlet and a fluid outlet; filter means disposed in said fluid passage for filtering a fluid passed therethrough; and flexible seal means positioned between said filter means and said inner surface of said casing for sealing said filter means in said fluid passage to prevent flow of fluid between said filter means and said inner surface and for allowing movement of said filter means relative to said casing.

In further accordance with the invention, said flexible seal means has a central portion sealed to said filter means and at least one end portion sealed to said inner surface, and a flexible portion disposed between said central portion and said at least one end portion.

Still further according to the invention, a filter assembly is provided having a casing having an inner surface defining a fluid passage, a fluid inlet and a fluid outlet; filter means disposed in said fluid passage for filtering a fluid passing therethrough; and face screen members positioned at said fluid inlet and said fluid outlet of said casing and having a laterally extending flange, said casing having flange receiving means for receiving said flange of said face screen, and an inwardly extending lip means extending at least partially over said face screen, whereby said face screen is secured at said fluid inlet and outlet with said flange in said flange receiving means.

A method is also provided according to the invention for manufacturing a filter assembly according to the invention, which method includes the steps of providing an unformed casing comprising four side wall portions; providing face screen members each comprising a substantially planar screen section having a laterally extending flange; positioning a filter means on one of said side wall portions; forming said side wall portions into a substantially rectangular casing having an inner surface defining a fluid passage, a fluid inlet, a fluid outlet, and at least one flange receiving means positioned at said fluid inlet and said fluid outlet, and a lip means extending beyond said flange receiving means; positioning said face screen members at said fluid inlet and said fluid outlet with said flange in said flange receiving means; and folding said lip means to a laterally inwardly extending position overlapping said face screen members whereby said face screen members are held in position over said fluid inlet and said fluid outlet with said flange in said flange receiving means.

BRIEF DESCRIPTION OF THE DRAWINGS

A detailed description of preferred embodiments of the invention follows, with reference to the accompanying drawings, wherein:

FIG. 1 illustrates a portion of a prior art filter assembly;

FIG. 2 is a vertical side sectional view of a filter assembly according to the invention;

FIG. 2a is a horizontal top sectional view of the filter assembly of FIG. 2;

FIG. 3 is a side sectional view of a non-rigid or flexible seal member according to the invention;

FIGS. 4–8 illustrate a method for assembling a filter assembly according to the invention.

DETAILED DESCRIPTION

Figure 9:
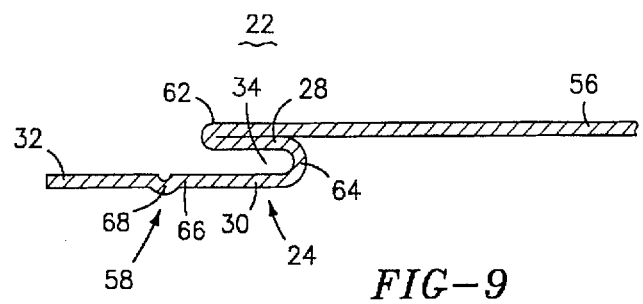
FIGS. 9–12 further illustrate a portion of the method of FIGS. 4–8.

The invention relates to a filter assembly for filtering a fluid such as air and other gases so as to remove entrained particles and the like. The filter casing according to the invention is useful, for example, as an air filter for a gas turbine air intake and similar applications.

Referring to the drawings, FIG. 2 is a side sectional view illustrating a filter assembly 10 according to the invention having a casing 12, a filter pack 14, face screens 16 and flexible or deflectable sealing members 18. Flexible or deflectable sealing members 18 according to the invention provide enhanced resistance to damage normally caused by vibration and pulsation of filter pack 14 due to oscillation of the force exerted on filter pack 14 in casing 12 due to air flow (arrow A) through filter assembly 10. Such oscillation in force may be caused for example by operation of a downstream gas turbine. Filter assembly 10 allows movement or pulsation of filter pack 14 (arrow B) responsive to oscillation in force thereby damping the forces exerted on filter pack 14. Filter housing 10 according to the invention also has a simplified structure for joining casing 12 and face screens 16 without the use of additional fastener components to provide a filter assembly having good structural integrity without using fasteners or other small parts which may come loose and damage downstream equipment and without using welding which may weaken some elements of the filter assembly.

Casing 12 is preferably a substantially rectangular four sided wrap around structure having four side walls 20 defining a fluid passage 21, a fluid inlet 22, and a fluid outlet 23. Face screens 16 are positioned over inlet 22 and outlet 23 so as to hold filter pack 14 in place in fluid passage 21 within casing 12. Casing 12 may preferably have structure 24 at inlet 22 and outlet 23 for receiving a flange 26 of face screens 16 as will be thoroughly discussed below. Structure 24 may suitably be defined according to the invention by an extension of side walls 20 having a first segment 28 angled back away from inlet 22 or outlet 23, a second segment 30 angled forward toward inlet 22 or outlet 23 and a third segment 32 oriented laterally inwardly as shown. First segment 28 and second segment 30 serve to define structure 24, preferably in the form of a peripheral groove 34 around the periphery of inlet 22 or outlet 23 substantially as shown. Third segment 32 defines an inwardly projecting lip which serves to hold face screen 16 in place over inlet 22 and outlet 23 as desired.

As set forth above, it is preferable that casing 12 be an integral structure including segments 28, 30 and 32 so as to avoid the need for conventional fasteners which can come loose and be drawn into downstream equipment such as a gas turbine or spot welding which may weaken material for example through corrosion. Segments 28, 30 and 32 are therefore continuous extensions of side walls 20 of casing 12. In order to facilitate the manufacture of filter assembly 10 according to the invention, casing 12 is preferably made of a deformable or bendable material. Examples of suitable material include galvanized, painted or other finished or unfinished steel, copper, aluminum or other bendable material, most preferably galvanized steel, although numerous materials could of course be used depending upon the application or end use of filter assembly 10.

FIG. 2 shows a preferred embodiment of casing 12 according to the invention having inlet 22 and outlet 23 on ends of casing 12. It should be appreciated that depending upon the intended use of filter assembly 10, inlet 22 and outlet 23 could be provided and/or positioned differently as desired.

Face screens 16 may preferably be provided having any desired screen structure for holding filter pack 14 in place inside casing 12 while allowing substantially unrestricted flow of air to be filtered through filter assembly 10. Face screen 16 according to the invention preferably includes a substantially planar screen portion 17 having a screen configuration which may be selected depending upon the intended use of filter assembly 10. Face screen 16 also includes a flange structure 26 which preferably extends laterally from an edge of screen portion 17, preferably substantially perpendicular with respect to the plane of screen portion 17. Face screens 16 may be provided from any suitable material such as, for example, expanded metal, wire mesh and the like. Face screens 16 also help to ensure that filter pack 14 is retained within casing 12 in the event of large pressure drops (for example in excess of 30 inches water gage) across the filter assembly which might break filter pack 14 loose.

Filter pack 14 is preferably provided of a material selected so as to remove entrained material in a fluid to be filtered. FIG. 2a is a top sectional view of filter assembly 10 including a preferred embodiment of filter pack 14 according to the invention. Filter pack 14 is preferably a pleated extended surface filter media 36 as illustrated, having two ends 38, top and bottom edges 39 and an intermediate portion 40 disposed in a desired filter pattern such as the repeated S pattern of FIG. 2a. Filter pack 14 may suitably include separators 100 (also shown schematically in FIG. 1) for keeping pleats of filter media 36 separate as desired. It should also be noted that the illustration of FIG. 2a is simplified for the sake of clarity and that filter pack 14 may typically include a greater number of pleats. As best shown in FIG. 2a to be discussed below, filter pack 14 may suitably be made of filter media 36 pleated or otherwise formed into a substantially square or rectangular configuration having side surfaces and edges at least some of which are sealed to casing 12 and to sealing member 18 so as to advantageously damp vibrations and pulsations affecting filter pack 14 as will be discussed below.

According to the invention, filter pack 14 is movably sealed within casing 12 using flexible sealing members 18 preferably provided as strips or sheets of material having strength and flexibility sufficient to seal filter media 36 to casing 12 and to allow pulsation of filter media 36 relative to casing 12 (as illustrated by arrow B). Members 18 may for example be provided from a simple corrugated material or any of numerous other alternatives. Members 18 are preferably substantially flat strips 44 having a first surface 46 and an opposed second surface 48, ends 50 and a central portion 52 positioned therebetween. It should be noted that seal members 18 need not be provided of a sealing material. Rather, seal members 18 are provided of a material which may be filter material if desired. Sealing member 18 serves according to the invention to sealingly associate filter pack 14 with casing 12 while allowing movement of filter pack 14 relative to casing 12 as desired.

According to the invention, one end 50 of strip 44 is sealed to casing 12 using glue or any other desired means, while central portion 52 of strip 44 is sealed to filter pack 14 also using glue or any other desired means. Strip 44 is preferably sealed to both casing 12 and filter pack 14 on first surface 46 thereof by providing a bend or flexible portion 54 between end 50 and central portion 52 substantially as shown. It should be noted that strip 44 is attached to casing 12 at one end 50 as shown in FIG. 2, in which case the attached end 50 is preferably the end facing the incoming air stream. Alternatively, both ends 50 of strip 44 could be sealed to casing 12 if desired.

As set forth above, filter pack 14 is preferably sealed to the inner surfaces of casing 12 so as to prevent bypass flow of non-filtered air or other fluid between filter pack 14 and casing 12. According to the invention, filter pack 14 is sealed to casing 12 in a flexible non-rigid manner so that filter pack 14 is free to pulsate as illustrated by arrow B in FIGS. 2–2a. Allowing such pulsation serves to dampen adverse forces exerted on filter pack 14 during use and therefore to extend the useful life of filter assembly 10 according to the invention.

Referring to FIG. 2a, ends 38 of filter media 36 may suitably be sealed directly to casing 12 as shown. These portions of filter media 36 may be sealed directly to casing 12 because the folds of the pleated structure serve to allow pulsation as desired. Referring to FIG. 2, edges 39 of filter media 36 are sealed according to the invention to flexible sealing member 18. It should be noted that various elements of the invention are referred to as sealed. Such sealing may be provided for example using glue schematically illustrated in the drawings at 42. Of course, numerous other means for sealing may be used.

The sealing of edges 39 to flexible sealing member 18 serves to free filter media 36 for pulsation in the direction of arrow B as set forth above. This is advantageous and in clear contrast to the fixed nature of prior art filter assemblies such as that illustrated in FIG. 1.

The prior art filter of FIG. 1 has the bottom edge 1 of the filter sealed directly to the casing 2. During use, oscillations in force exerted on the filter result in cracks 3 in filter media 4 as shown, thereby allowing bypass flow and destroying the effectiveness of the prior art device. The non-rigid nature of flexible sealing members 18 according to the invention allows pulsation of filter pack 14 as desired, thereby damping the effects of oscillations in force on filter media 36 and reducing or eliminating the risk of filter media 36 being damaged by such forces.

Referring to FIG. 3, the advantages provided by the non-rigid seal of the present invention are further illustrated. FIG. 3 shows a portion of filter pack 14 attached to first surface 46 of central portion 52 of strip 44. Strip 44 is also attached at first surface 46 of end 50 to casing 12. Flexible portion 54 of strip 44 is free to roll forward (arrow C) and backward (arrow D) relative to casing 12 and advantageously serves to allow filter pack 14 to pulsate or move, preferably upstream and downstream in a direction of flow in fluid passage 21, so as to dampen pulsations caused by air flow or operation of a downstream gas turbine, thereby reducing the destructive forces to which filter pack 14 is exposed. A normal position is illustrated by the solid lines in FIG. 3, with pulsed forward and rearward positions illustrated in dashed lines. Responsive to oscillations in force, flexible portion 54 rolls forward or backward with respect to casing 12 as illustrated, thereby absorbing the force which would normally be exerted directly upon a rigidly sealed filter. It should be clear that the non-rigid seal of the present invention readily avoids the problem illustrated in FIG. 1 by damping the forces which would otherwise cause cracks in filter media 36.

Referring now to FIGS. 4–8, a method for manufacturing a filter assembly 10 according to the invention will be described. Initially, an unformed casing 12 may be provided which preferably comprises four wall sections 56 preferably joined end to end in a row as shown in FIG. 4. Casing 12 is preferably a one piece structure as shown. Wall sections 56 of unformed casing 12 preferably have extending portions 58 formed into segments 28, 30, 32 as discussed above and as further illustrated in FIGS. 9–12. Extending portions 58 preferably extend from sides of wall sections 56 corresponding to side edges 60 of the row of wall sections 56 as shown so that, when unformed casing 12 is formed into the desired rectangular structure, extending portions 58 are arranged around the periphery of inlet 22 and outlet 23.

Filter pack 14 is provided for example as a pleated extended surface filter structure as discussed above and mounted to one wall section 56 (See FIG. 5). Filter pack 14 is preferably attached at bottom edge 39 to sealing member 18 which is attached to wall section 56, as illustrated.

Casing 12 is then formed around filter pack 14 by bending or otherwise forming wall sections 56 into a substantially rectangular structure enclosing filter pack 14 as desired (See FIG. 6). Depending upon the materials used for casing 12, such bending may be accomplished by hand or by any conventional material bending means. During this step, filter pack 14 is preferably attached to the remaining wall sections 56 of casing 12 as desired, with top edge 39 being attached to a sealing member (not shown) in a similar manner to bottom edge 39, and with ends 50 being attached directly to casing 12 as discussed above.

Face screens 16 are then positioned over inlet 22 and outlet 23 (FIG. 7), with flange portions 26 inserted into groove 34 of flange receiving structure 24. With face screens 16 in place, third segment 32 of casing 12 is then bent inwardly to provide a lip extending laterally inward over a portion of face screen 16 so as to hold face screen in position over inlet 22 and outlet 23 with flange 26 disposed in groove 34 (See FIG. 8).

FIGS. 9–12 further illustrate the above described steps with respect to segments 28, 30 and 32 and the joining of casing 12 and face screens 16. FIG. 9 illustrates a preferred structure of extending portions 58 of casing 12 according to the invention. As shown, extending portion 58 preferably has first segment 28 extending back away from an edge 62 of inlet 22 (or outlet 23, not shown in this figure) and second segment 30 extending forward toward edge 62 so as to define groove 34 for receiving flange 26 of face screen 16. In the unformed position of FIG. 9, third segment 32 extends from second segment 30 beyond edge 62.

In accordance with the invention, first segment 28 preferably extends from edge 62 rearward away from edge 62 to a rearward end 64. Second segment 30 preferably extends forward from rearward end 64 toward edge 62 to a forward end 66. Third segment 32 preferably extends further forward from end 66 beyond edge 62 and is preferably substantially coplanar with second segment 30 in the unformed position.

Extending portion 58 may be provided with preformed shoulder sections 68 if desired, preferably positioned between second segment 30 and third segment 32 at end 66. Shoulder sections 68 serve to facilitate the bending of third segment 32 relative to second segment 30.

Figure 10:
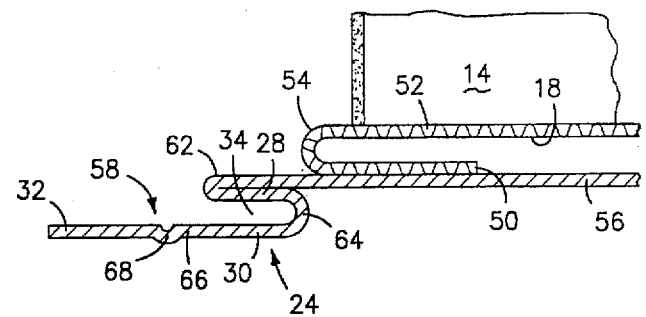

FIG. 10 illustrates the fixing or sealing of filter pack 14 to casing 12, preferably by gluing or otherwise sealing filter media 36 to sealing member 18, and by gluing or otherwise sealing sealing member 18 to casing 12 as shown in FIG. 10. Wall sections 56 are bent or formed into position around filter pack 14 (See FIG. 6).

Figure 11:
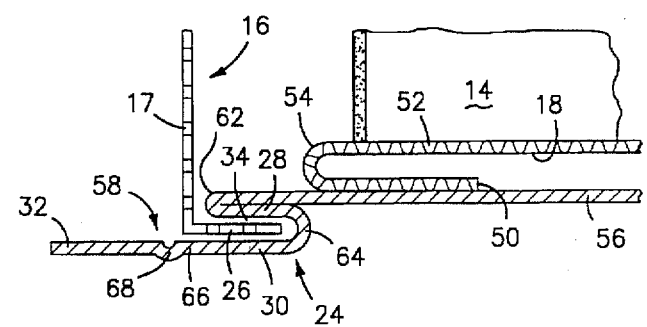

As shown in FIG. 11, face screens 16 are then positioned over inlet 22 (and outlet 23), with flange 26 inserted into groove 34 between first segment 28 and second segment 30. In this regard, it should be noted that flange 26 and groove 34 may preferably be provided around substantially the entire periphery of inlet 22 and outlet 23. Alternatively, flange 26 and groove 34 may be provided in selected locations around inlet 22 and outlet 23, so long as face screen 16 is held securely in place as desired so as to secure filter pack 14 within casing 12.

Figure 12:
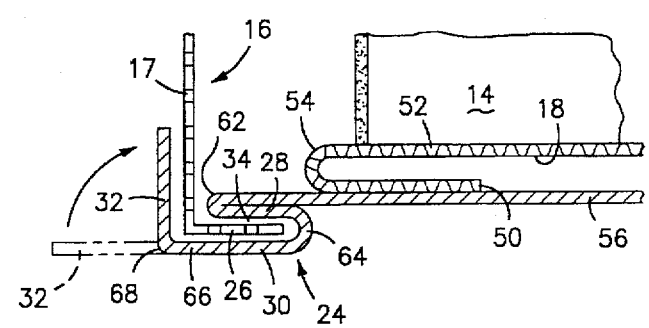

Referring to FIG. 12, third segment 32 of extending portion 58 is then preferably bent or otherwise deformed from the straight position illustrated in dashed lines to a laterally inwardly extending position to provide a lip which extends at least partially over face screen 16 so as to securely hold face screen 16 in position.

In accordance with the invention, it should be appreciated that there has been provided a filter assembly wherein the filter pack is effectively sealed to the filter casing, wherein the filter pack is movable with respect to the filter casing whereby oscillations in force during use are damped, and wherein the filter casing structure does not include conventional separate fastener components and is nevertheless very rigid and reduces or avoids racking.

The filter assembly of the present invention will retain the filter pack within the filter casing in the event of very high pressure drops across the filter pack (25 inch water gage) which might be caused by surges, implosion or explosion, or faulty start-up of the rotating equipment the filter is meant to protect.

Also provided is a method for manufacturing a filter casing incorporating the above described objects and advantages.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A filter assembly, comprising:
    a casing having an inner surface defining a fluid passage, a fluid inlet and a fluid outlet;
    filter means disposed in said fluid passage for filtering a fluid passed therethrough; and
    flexible seal means positioned between said filter means and said inner surface of said casing for sealing said filter means in said fluid passage to prevent flow of fluid between said filter means and said inner surface and for allowing movement of said filter means relative to said casing, therein said filter means comprises an elongate sheet of filter medium having two ends and two side edges, said two ends being sealed to said casing, and said side edges being sealed to said flexible seal means, whereby said filter means is movable relative to said casing and flow of fluid between said side edges and said inner surface is prevented.

2. A filter assembly according to claim 1, wherein said flexible seal means comprises a strip of flexible material sealed to said filter means at a first point and to said inner surface of said casing at a second point, and wherein said strip of material has a flexible portion between said first point and said second point, whereby said filter means is sealingly associated with said inner surface and is movable relative to said inner surface.

3. A filter assembly according to claim 1, wherein said flexible seal means has a central portion sealed to said filter means and at least one end portion sealed to said inner surface, and a flexible portion disposed between said central portion and said at least one end portion.

4. A filter assembly according to claim 1, wherein said flexible seal means seals said filter means in said fluid passage for allowing movement of said filter means relative to said casing in a direction of fluid flow in said fluid passage.

5. A filter assembly, comprising:
    a casing having an inner surface defining a fluid passage, a fluid inlet and a fluid outlet;
    filter means disposed in said fluid passage for filtering a fluid passing therethrough; and
    face screen members positioned at said fluid inlet and said fluid outlet of said casing and having a laterally extending flange, said casing having flange receiving means for receiving said flange of said face screen, and lip means extending over a portion of said flange receiving means and a portion of said face screen, whereby said face screens are secured at said fluid inlet and said fluid outlet with said flange in said flange receiving means.

6. A filter assembly according to claim 5, wherein said flange receiving means and said lip means are integral portions of said casing.

7. A filter assembly according to claim 5, wherein said inner surface terminates in an edge at each of said fluid inlet and said fluid outlet, and wherein said casing has at least one extending portion at said fluid inlet and said fluid outlet, said extending portion comprising a first segment extending backward away from said edge of said inner surface, a second segment extending forward toward said edge, and a third segment extending laterally inwardly, said first and second segments defining said flange receiving means and said third segment defining said lip means.

8. A filter assembly according to claim 5, wherein said face screens comprise a substantially planar screen member and said flange extends laterally substantially perpendicular to said planar screen member.

9. A filter assembly according to claim 5, wherein said flange receiving means defines a peripheral groove around at least a portion of said fluid inlet and said fluid outlet, said groove receiving said flange of said face screens.

10. A filter assembly according to claim 5, wherein said casing comprises a substantially rectangular structure having four side walls defining said fluid inlet and said fluid outlet, and further comprising filter means comprises a substantially rectangular filter having four sides corresponding to said side walls of said casing and further comprising flexible seal means positioned between at least one of said four sides of said filter means and at least one of said four side walls of said casing.

11. A filter assembly according to claim 5, further comprising flexible seal means positioned between said filter means and said inner surface for sealing said filter means in said fluid passage to prevent flow of fluid between said filter means and said inner surface and for allowing movement of said filter means relative to said casing.

12. A filter assembly according to claim 11, wherein said filter means has at least one side edge, and wherein said flexible seal means comprises a flexible seal member sealed to said at least one side edge of said filter means and to said inner surface of said casing for allowing movement of said filter means relative to said inner surface.

13. A filter assembly according to claim 11, wherein said flexible seal means comprises a strip of flexible material sealed to said filter means at a first point and to said inner surface of said casing at a second point, and wherein said strip of material has a flexible portion between said first point and said second point, whereby said filter means is sealingly associated with said inner surface and is movable relative to said inner surface.

14. A filter assembly according to claim 11, wherein said flexible seal means has a central portion sealed to said filter means and at least one end portion sealed to said inner surface, and a flexible portion disposed between said central portion and said at least one end portion.

15. A filter assembly, comprising:
a casing having an inner surface defining a fluid passage, a fluid inlet and a fluid outlet;
filter means disposed in said fluid passage for filtering a fluid passed therethrough; and
flexible seal means positioned between said filter means and said inner surface of said casing for sealing said filter means in said fluid passage to prevent flow of fluid between said filter means and said inner surface and for allowing movement of said filter means relative to said casing, wherein said casing comprises a substantially rectangular structure having four side walls defining said fluid inlet and said fluid outlet, and wherein said filter means comprises a substantially rectangular filter having four sides corresponding to said side walls of said casing, and wherein said flexible seal means is positioned between at least one of said four sides of said filter means and at least one of said four side walls of said casing.

16. A method for manufacturing a filter assembly, comprising the steps of:
providing an unformed casing comprising four side wall portions;
providing face screen members each comprising a substantially planar screen section having a laterally extending flange;
positioning a filter means on one of said side wall portions;
forming said side wall portions into a substantially rectangular casing having an inner surface defining a fluid passage, a fluid inlet, a fluid outlet, and at least one flange receiving means positioned at said fluid inlet and said fluid outlet, and a lip means extending beyond said flange receiving means;
positioning said face screen members at said fluid inlet and said fluid outlet with said flange in said flange receiving means; and
folding said lip means to a laterally inwardly extending position overlapping said face screen members whereby said face screen members are held in position over said fluid inlet and said fluid outlet with said flange in said flange receiving means.

17. A method according to claim 16, wherein said step of providing said unformed casing comprises the step of providing said four side wall portions in a substantially planar configuration with said side wall portions arranged in a row, wherein said side wall portions have extending portion extending from sides of said row, said extending portions comprising a first segment extending inward away from said sides of said row, a second segment extending outward toward said sides of said row, and a third segment extending beyond said sides of said row, wherein said first and second segments define said flange receiving means and said third segment is said lip means.

18. A method according to claim 16, wherein said step of providing said unformed casing comprises providing said four connected side wall portions as a single continuous sheet of material.

19. A method according to claim 16, wherein said step of providing said unformed casing comprises providing said four connected side wall portions as a single continuous sheet of galvanized steel.

20. A method according to claim 16, further comprising the step of flexibly sealing said filter means to at least one side wall portion of said casing.

21. A method according to claim 16, further comprising the step of providing flexible seal means for sealing said filter means in said fluid passage, sealing said filter means to said flexible seal means, and sealing said flexible seal means to said at least one side wall portion.

22. A method according to claim 16, wherein said filter means comprises an elongate sheet of filter material having ends and side edges, and further comprising the steps of providing a flexible seal means comprising a strip of flexible material having a central portion, at least one end portion and at least one flexible portion between said central portion and said at least one end, sealing said side edges of said filter material to said central portion of said flexible seal means, and sealing said at least one end portion to said side wall portion, whereby said filter means is sealed in said fluid passage to prevent flow of fluid between said filter means and said inner surface.

* * * * *